US012519905B1

(12) United States Patent
Briggs et al.

(10) Patent No.: US 12,519,905 B1
(45) Date of Patent: Jan. 6, 2026

(54) CONFIGURABLE RECORDINGS OF COMPOSITE VIDEO LIVE STREAMS

(71) Applicant: StreamYard, Inc., Wilmington, DE (US)

(72) Inventors: Dan Briggs, Vancouver, WA (US); Martin Huang, Middle Village, NY (US); Steven McFarlin, Redding, CA (US)

(73) Assignee: StreamYard, Inc., New York, NY (US)

( * ) Notice: Subject to any disclaimer, the term of this patent is extended or adjusted under 35 U.S.C. 154(b) by 244 days.

(21) Appl. No.: 18/350,174

(22) Filed: Jul. 11, 2023

(51) Int. Cl.
| | | |
|---|---|---|
| *H04N 7/15* | (2006.01) | |
| *G06F 3/14* | (2006.01) | |
| *G06V 20/40* | (2022.01) | |
| *H04N 21/2187* | (2011.01) | |
| *H04N 21/234* | (2011.01) | |
| *H04N 21/2343* | (2011.01) | |

(52) U.S. Cl.
CPC .......... *H04N 7/152* (2013.01); *G06F 3/1454* (2013.01); *G06V 20/44* (2022.01); *H04N 7/155* (2013.01); *H04N 21/2187* (2013.01); *H04N 21/23424* (2013.01); *H04N 21/234372* (2013.01)

(58) Field of Classification Search
CPC .... H04N 7/152; H04N 7/155; H04N 21/2187; H04N 21/23424; H04N 21/234372; G06V 20/44; G06F 3/1454
USPC ...................................................... 348/14.09
See application file for complete search history.

(56) References Cited

U.S. PATENT DOCUMENTS

| | | | | |
|---|---|---|---|---|
| 11,381,628 B1* | 7/2022 | Hesters | .................. | H04L 65/65 |
| 11,689,749 B1* | 6/2023 | Briggs | ............... | H04N 21/2343 |
| | | | | 709/231 |
| 12,126,843 B2* | 10/2024 | Briggs | ............... | H04N 21/2187 |
| 2009/0290024 A1* | 11/2009 | Larson | ............... | H04N 1/00188 |
| | | | | 709/217 |
| 2014/0297829 A1* | 10/2014 | Miyazawa | ............ | H04L 69/329 |
| | | | | 709/223 |
| 2016/0301723 A1* | 10/2016 | Sinclair | ................ | H04L 65/403 |
| 2018/0034887 A1* | 2/2018 | Dunne | ................ | H04L 12/1831 |
| 2022/0374585 A1* | 11/2022 | Wang | ..................... | G11B 27/34 |
| 2023/0269108 A1* | 8/2023 | Goynar | .................. | G06F 21/31 |
| | | | | 709/204 |
| 2023/0281097 A1* | 9/2023 | Khaitan | ............. | G06F 11/3075 |
| | | | | 707/687 |
| 2024/0251112 A1* | 7/2024 | Carter | .................. | H04N 21/237 |
| 2024/0406018 A1* | 12/2024 | Geddes | ................. | H04N 7/155 |

\* cited by examiner

*Primary Examiner* — Binh Kien Tieu
(74) *Attorney, Agent, or Firm* — Erise IP, P.A.

(57) ABSTRACT

Systems, methods, and computer-readable media are provided for generating configurable recordings of video live streams. A video live stream may comprise a plurality of participant video streams received from a plurality of video stream participants. Assets, such as graphical overlays, may be added to a video live stream and rendered over the participant video streams. The participant video streams and the assets may be composited to produce a composite video live stream. During the video live stream, events may be detected and logged. The events may be any change during the video live stream. Each video stream participant may generate a local recording of the corresponding participant video stream. A composite video recording may be generated based on the local recordings and the events. The composite video recording may be editable once produced.

20 Claims, 8 Drawing Sheets

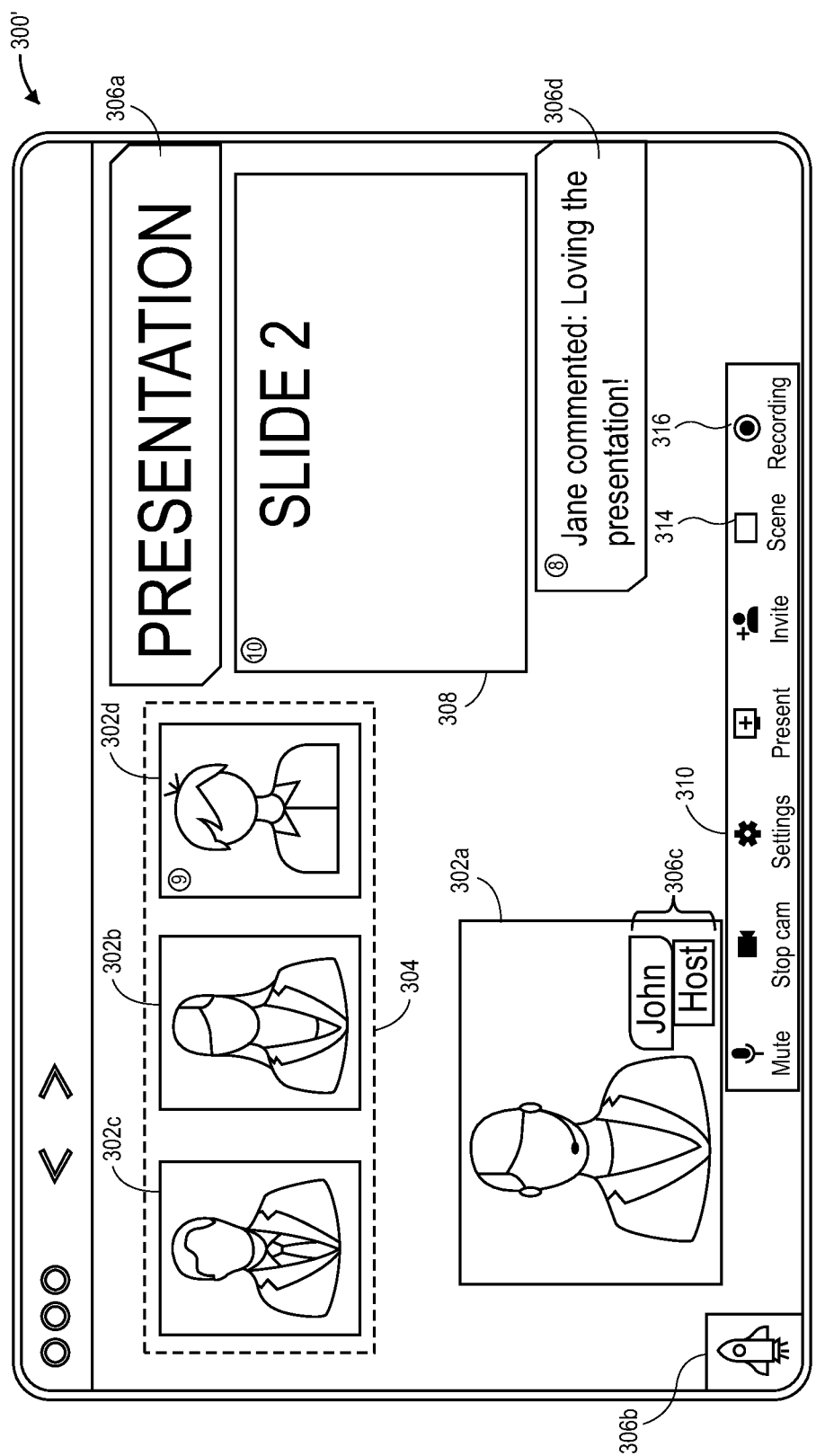

CONFIGURABLE RECORDINGS OF COMPOSITE VIDEO LIVE STREAMS

TECHNICAL FIELD

1. Field

Embodiments of the present disclosure relate to video live streaming. More specifically, embodiments of the present disclosure relate to generating configurable, composite video recordings from locally recorded video streams.

2. Related Art

It is useful to record video live streams (or any other videos) for later playback. Video live streams are generally recorded at a cloud server. Accordingly, the recordings are made at a degraded quality relative to a native quality of the video data generated by a client device due to bandwidth restrictions. To preserve the native quality of the video data, recordings may be generated locally on the client device. However, such recordings comprise the video data only and fail to capture any video overlays, graphics, textual add-ins, and other similar video streaming assets that may be a part of the video live stream. For example, a video live stream may display a graphical overlay that displays the name and role of each participant (e.g., John Doe: conference host; Jane Doe: conference panelist, etc.). Such graphical overlays and other media, such as screen shared data, banner overlays, and the like are typically mixed with the video data at the cloud server and, therefore, are not captured in a local recording. Accordingly, local recordings fail to accurately replicate the video live stream. Furthermore, limited options exist to edit a recorded composite video stream because the assets and the video streams are mixed. What is needed are improvements in recordings of video live streams.

SUMMARY

In some embodiments, the techniques described herein relate to one or more non-transitory computer-readable media storing computer executable instructions that, when executed by at least one processor, perform a method for generating video live stream recordings, the method including: initiating a video live stream, the video live stream including a plurality of participant video streams received from a plurality of video stream participants; rendering the video live stream by compositing the plurality of participant video streams and one or more assets; logging a plurality of events during the video live stream; receiving a local recording from each of the plurality of video stream participants to obtain a plurality of local recordings, wherein each video stream participant is configured to generate the local recording on a participant client device; generating a first composite video recording for the video live stream by compositing the plurality of local recordings and replicating the plurality of events at a timestamp for each event of the plurality of events; receiving an instruction to modify an event of the plurality of events in the first composite video recording; and responsive to receiving the instruction, modifying the event in the first composite video recording to obtain a second composite video recording.

In some embodiments, the techniques described herein relate to a computer-readable media, wherein the event is associated with an asset of the one or more assets, and wherein modifying the event includes adjusting the timestamp associated with the asset.

In some embodiments, the techniques described herein relate to a computer-readable media, wherein the method further includes: receiving a second instruction to modify the first composite video recording, wherein the second instruction is one of an addition of a new asset or a deletion of an asset of the one or more assets; and responsive to receiving the second instruction, modifying the second composite video recording based on the second instruction.

In some embodiments, the techniques described herein relate to a computer-readable media, wherein the one or more assets includes at least one of a graphical overlay or a media file.

In some embodiments, the techniques described herein relate to a computer-readable media, wherein the event is an addition of a user interface element to a user interface for the video live stream, and wherein modifying the event includes modifying a location of the user interface element within the user interface.

In some embodiments, the techniques described herein relate to a computer-readable media, further including: during the video live stream, receiving an upload of an asset from one of the plurality of video stream participants; responsive to receiving the upload of the asset: causing display of the asset in the video live stream; and storing the asset in a data storage, wherein generating the first composite video recording includes retrieving the asset from the data storage and inserting the asset into the first composite video recording at the timestamp.

In some embodiments, the techniques described herein relate to a computer-readable media, wherein the method further includes: receiving a second instruction to split a video portion from the second composite video recording; responsive to receiving the second instruction, generating the split video portion, wherein the split video portion includes a first aspect ratio distinct from a second aspect ratio of the second composite video recording.

In some embodiments, the techniques described herein relate to a system for generating video lives stream recordings, the system including at least one processor programmed to carry out computer-executable instructions, including: initiating a video live stream, the video live stream including a plurality of participant video streams received from a plurality of video stream participants; rendering the video live stream based on the plurality of participant video streams and a plurality of assets; responsive to receiving a first instruction to record the video live stream, transmitting a second instruction to each of the plurality of video stream participants to generate a local recording of a corresponding participant video stream; detecting a plurality of events during the video live stream; storing a timestamp for each event of the plurality of events; receiving the local recording from each of the plurality of video stream participants to obtain a plurality of local recordings; and generating a composite video recording for the video live stream by compositing the plurality of local recordings and replicating the plurality of events at the timestamp for each event of the plurality of events.

In some embodiments, the techniques described herein relate to a system, wherein the instructions further include: receiving a third instruction to modify at least one event of the plurality of events in the composite video recording; and responsive to receiving the third instruction, modifying the at least one event to obtain a modified composite video recording.

In some embodiments, the techniques described herein relate to a system, wherein the plurality of events includes one or more comments received during the video live stream.

In some embodiments, the techniques described herein relate to a system, wherein modifying the at least one event includes changing a text of a comment of the one or more comments.

In some embodiments, the techniques described herein relate to a system, wherein the instructions further include: wherein an event of the plurality of events is a scene layout change causing a simultaneous change to at least two assets of the plurality of assets in the video live stream; and wherein modifying the event includes adjusting the timestamp associated with the scene layout change.

In some embodiments, the techniques described herein relate to a system, wherein the instructions further include: receiving a third instruction to modify an aspect ratio of the composite video recording; and responsive to receiving the third instruction, generating a modified composite video recording based on the aspect ratio.

In some embodiments, the techniques described herein relate to a method for generating video live stream recordings, the method including: initiating a video live stream, the video live stream including a plurality of participant video streams received from a plurality of video stream participants; rendering the video live stream based on the plurality of participant video streams and one or more assets; logging a plurality of events during the video live stream; instructing each of the plurality of video stream participants to generate a local recording on a participant client device of each of the plurality of video stream participants; receiving the local recording from each of the plurality of video stream participants to obtain a plurality of local recordings; generating, based on the plurality of local recordings and the plurality of events, a combined recording for the video live stream.

In some embodiments, the techniques described herein relate to a method, wherein at least one asset of the one or more assets is associated with an event of the plurality of events, and wherein generating the combined recording includes inserting the one or more assets into the combined recording based on the plurality of events.

In some embodiments, the techniques described herein relate to a method, wherein a first event of the plurality of events is a screen share event of a slide deck, and wherein a second event of the plurality of events is a slide change of the slide deck.

In some embodiments, the techniques described herein relate to a method, further including: responsive to receiving an instruction to modify the second event, modifying the second event, wherein modifying the second event includes causing the slide change of the slide deck to occur at a first time distinct from a second time at which the slide change occurred in the video live stream.

In some embodiments, the techniques described herein relate to a method, further including: responsive to a video stream participant initiating a screen share session, transmitting an additional instruction to the video stream participant to generate an additional local recording of the screen share session.

In some embodiments, the techniques described herein relate to a method, wherein each local client device is configured to upload the local recording during the video live stream.

In some embodiments, the techniques described herein relate to a method, further including: responsive to detecting an upload speed below a threshold upload speed, pausing an upload of the local recording; and responsive to detecting the upload speed is above the threshold upload speed, resuming the upload of the local recording.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 3B illustrates a second user interface for some embodiments of the present disclosure;

Figure 1:
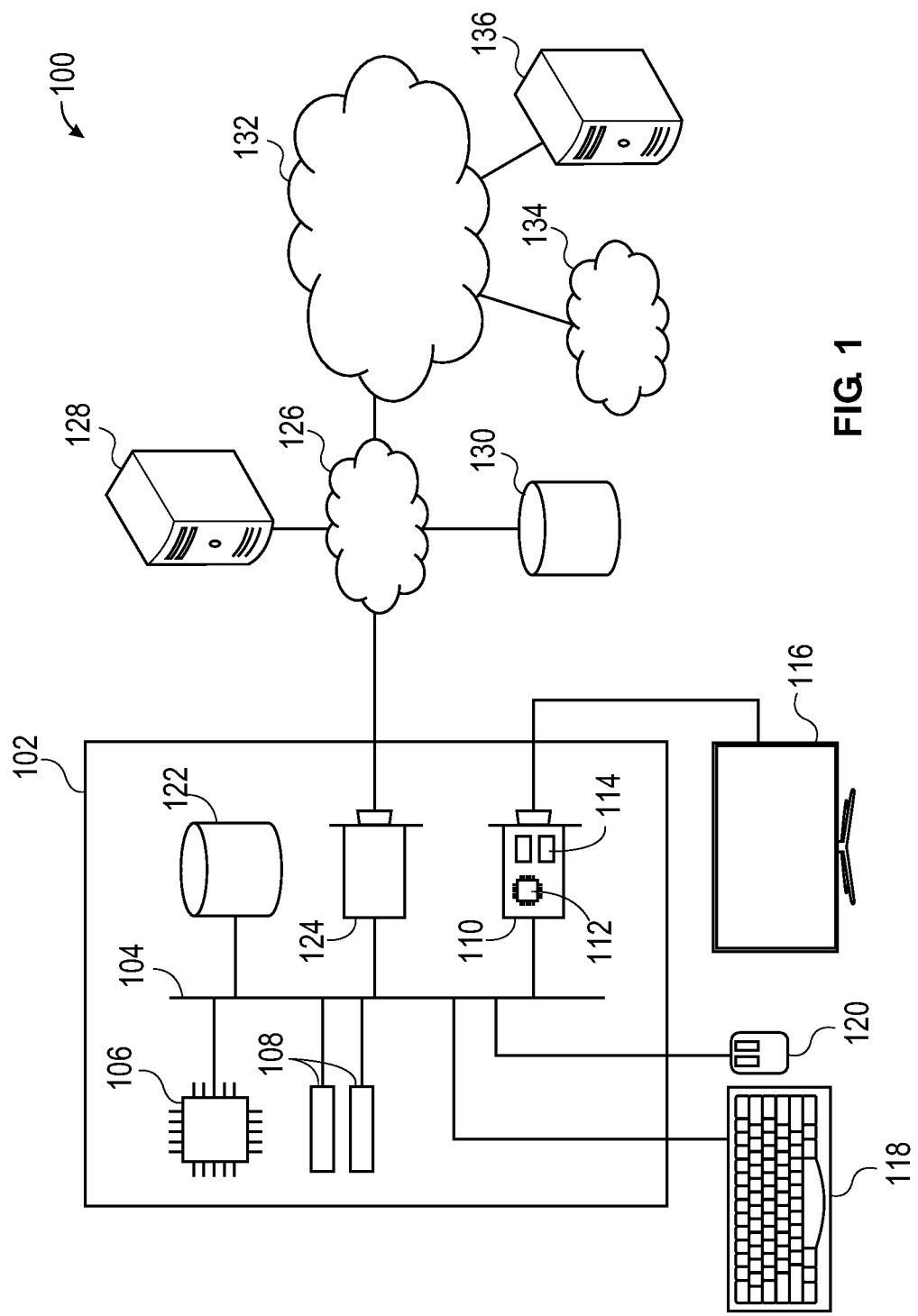
FIG. 1 depicts an exemplary hardware platform relating to certain embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments herein are generally directed to recordings of video live streams. A video live stream may comprise video from one or more video live stream participants and one or more assets (e.g., graphical overlays). The video from each video live stream participant may be mixed with the video from other live stream participants and the one or more assets. A composite video stream may then be produced and transmitted to viewers of the video live stream.

During the video live stream, recording of the video live stream may be initiated. The recording may be a local recording such that each video live stream participant generates a native recording of their video stream data. Each video live stream participant may upload their local recording to a recording server, and the recording server may composite the local recordings together, along with any assets used during the video live stream, to generate a composite video recording that may be a replica of the actual video live stream. During the video live stream, events, such as the addition of an asset to the video live stream, may be monitored, logged, stored, etc., such that the events can be replayed to generate the composite video recording. An editing user may generate a custom composite video recording by adjusting any of the events. For example, the editing user may edit the composite video recording to display an asset at an earlier time than the asset was displayed during the video live stream.

While embodiments of the present disclosure are generally discussed with respect to video live streaming, it will be appreciated that the recordings described herein may also be used for videos that are not made during a live stream. For example, one or more users may participate in a video conference that is not live streamed to any external destination, and the video streams for each user may be recorded locally and a composite recording may be generated therefrom as discussed further below.

Turning first to FIG. 1, an exemplary hardware platform 100 for certain embodiments of the present disclosure is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. CPU 106 (also called a processor) may be configured to execute computer-executable instructions. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-executable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2A:
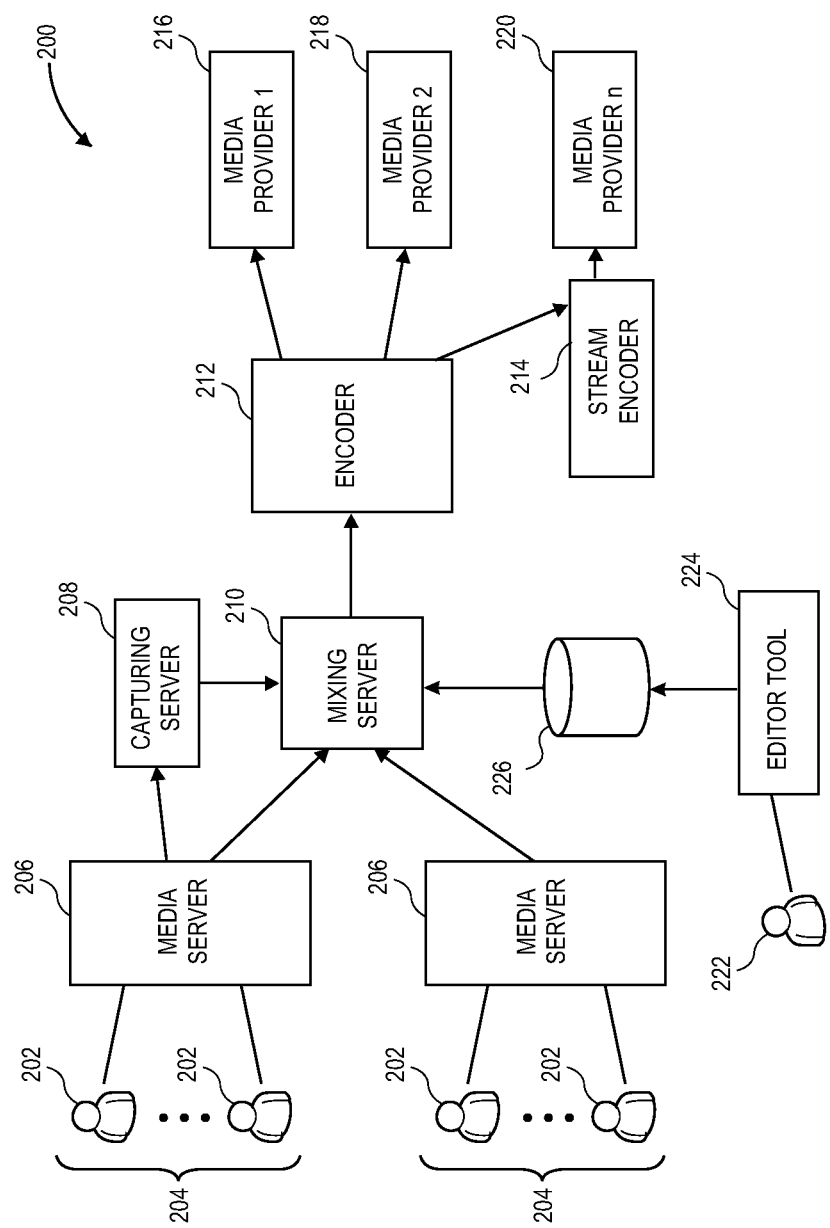
FIG. 2A illustrates elements of a system for carrying out embodiments of the present disclosure.

FIG. 2A illustrates elements of a system 200 for carrying out embodiments of the present disclosure. In some embodiments, users 202 are grouped into or more instances of studio 204 for connecting to a single instance of media server 206. In these embodiments, associating a group of users 202 in a particular instance of studio 204 with a single instance of a media server 206 has the benefit of eliminating a need for multiple instances of media server 206 to perform inter-server communication. In these embodiments, a number of users 202 in a particular instance of studio 204 is small enough (on the order of ten or so) that a single instance of media server 206 is adequate to receive from and transmit various video streams associated with studio 204.

In some embodiments, users 202 may use devices with low computational power to record a single stream of video and stream that video to media server 206. In some embodiments, where users 202 are on a relatively low-bandwidth connection, a lossy compression may be employed so that a particular video stream is able to keep up within the constraints of the low-bandwidth connection. In some such embodiments, where lossy compression is employed for the live stream, a lossless version of the recording is persisted locally, for example, on a storage medium associated with a client device of one of users 202 that has only a low-bandwidth connection. In such embodiments, once the live streaming has concluded, or in the case where a high-bandwidth connection is encountered, the lossless recording of the recorded video is uploaded to media server 206 and subsequently forwarded on to capturing server 208. In some embodiments, the lossless recording of the recorded video is transmitted directly to capturing server 208. In alternative embodiments, where the one of users 202 has a high-bandwidth connection, the lossless recording may be streamed substantially simultaneously with the compressed stream that is used to render a composite video stream.

In some embodiments, the video streams may be mixed and rendered on a web page by a simulated browser in connection with the mixing server. Embodiments are contemplated in which a first communication protocol is used for receiving individual video streams from the plurality of participant users and a second communication protocol distinct from the first is used for providing the mixed video stream to a multitude of live stream viewing users, which may optionally receive live streaming video from one or more media providers.

As further described in connection with FIG. 2A below, in some embodiments, mixing server 210 receives multiple streams and other multimedia assets and descriptors to render a composite video stream. In some such embodiments, mixing server 210 renders the composite video in connection with a simulated-display browser rendering engine running on mixing server 210. A simulated-display browser rendering engine operates like a web browser in that it renders a web page based on a rendering template such as, for example, Hypertext Markup Language (HTML) or other web-based markup in order to render various components of a mixed set of video streams, generating a single stream from the individual streams and any associated text and graphics. In some embodiments, the simulated display browser may be referred to as a headless browser. The simulated display browser, however, is not necessarily connected to a physical display. Instead (or in addition), the visual components of the associated simulated display may be mapped to a storage location or memory associated with mixing server 210 in such a way that the simulated display can nevertheless be subject to a simulated screen capture process, whereby a single video stream video of the simulated display is captured and persisted to a shared memory associated with mixing server 210. In some embodiments, the shared memory may be an operating-system-based file system that implements concurrency controls so that multiple processes may read from the composite video stream while mixing server 210 continually adds contents to the video stream.

Mixing server 210 may be a dedicated server, a shared server, a virtual machine instance in a cloud computing environment, or any other form of computing device discussed above with respect to FIG. 1. Mixing server 210 may also be implemented in connection with containers (e.g., DOCKER-style containers) as provided by platform-as-a-service (PaaS) technologies with virtualized host operating systems or with any number of serverless PaaS technologies.

Although a single instance of mixing server 210 is depicted, embodiments with multiple such services are also contemplated to provide scale, redundancy and/or isolation between different instances of a composite video live streaming platform. For example, a live stream organizer hosting a private live stream in which viewers register under a non-disclosure agreement may not wish to have the confidential live stream hosted on the same system as another live stream organizer's live stream, for security reasons. Moreover, a live stream with a large number of participants or potential guests may require multiple instances of mixing server 210 for scaling purposes to provide sufficiently performant interactive response times that are adequate to provide an acceptable user experience.

In some embodiments, once the simulated browser rendering engine associated with mixing server 210 has rendered composite video frames and the rendered composite video frames have been captured and persisted to a shared memory associated with mixing server 210, the captured frames may be encoded in connection with encoder 212 into an encoded format that is compatible with various media providers such as media provider 216, media provider 218, and media provider 220. These various media providers may correspond to any type of social media platform that facilitates live streaming. In some embodiments, encoder 212 may be implemented in connection with a video encoding process that receives a stream of frames and produces an encoded video stream. For example, one such video encoding process, FFmpeg, provides a suite of libraries and programs for processing multimedia files and streams. In some alternative embodiments, after encoder 212 encodes the captured frames, a subsequent video stream encoding process 214 carries out post-processing encoding to, for example, encode additional information or change a video format or associated compression scheme associated with the composite video stream being provided to media provider 220.

In some embodiments, an editing user 222 operates an editor tool 224 to create one or more custom user-defined video live stream interfaces. In some embodiments, the custom user-defined video live stream interfaces may be stored within an interface template repository 226, as shown, or other data store storing interface templates. In some embodiments, the interface template repository 226 may be communicatively coupled to the mixing server 210 such that one or more predefined interface templates may be selected for a video communication session. Accordingly, video live streams may be rendered based on the selected interface template. In some embodiments, the interface template may be selected from one or more preconfigured interface templates and one or more custom user-defined interface templates stored on the interface template repository 226.

Figure 2B:
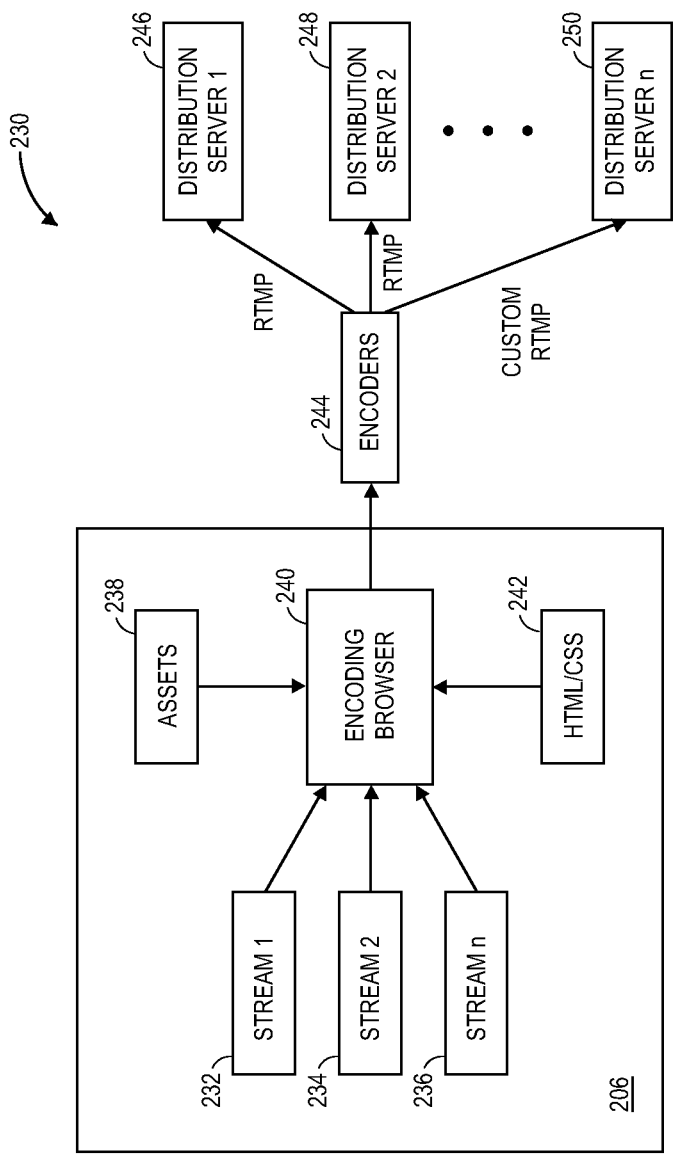
FIG. 2B illustrates elements of a system for carrying out embodiments of the present disclosure.

FIG. 2B illustrates elements of a system 230 for carrying out alternative embodiments of the present disclosure. System 230 depicts an expanded view of media server 206 in which media server 206 takes on the roles of media server as well as mixing server 210 and capturing server 208 for ease of description. In these embodiments, multiple streams such as stream 232, stream 234, and stream 236 are received into media server 206 and processed in connection with encoding browser 240. In some embodiments, encoding browser 240 is a simulated display browser that relies on a web browser rendering engine to render a simulated web page, in which the rendered web page is not necessarily sent to a physical display but merely rendered in a memory that could be forwarded to a physical display but could also be further processed and/or captured. In some embodiments, encoding browser 240 employs a modified version of a browser rendering engine, such as CHROMIUM, that renders its display to a virtual display server such as a graphical windowing display server. It is an advantage of such an approach that the existing layout and video decoding capabilities of encoding browser 240 can be utilized rather than writing a custom video decoder/layout/rendering engine for each layout of video that might be used in the video event hosting service. In some such embodiments, a network-capable sound server is employed to process an audio stream associated with the audiovisual streams received by encoding browser 240. In other embodiments, a voice chat mixing service such as OPENTALK is used to process the audio streams for communication among the participants as well as the audio portion of the combined video stream.

In some embodiments, a browser window layout as rendered and captured in connection with encoding browser 240 is formatted in connection with HTML and/or CSS from formatting source 242. Additionally, or in the alternative, assets 238 are provided to encoding browser 240 so that encoding browser 240 may render various graphical assets in connection with the rendered composite video stream, where assets 238 may represent backgrounds, logos, and/or other graphics to augment the composite video stream and provide a consistent branding experience, etc.

In some embodiments, the output from encoding browser 240 is provided to subsequent downstream encoders 244. As described above in connection with FIG. 2A, such encoders may provide an output in a real-time messaging protocol (RTMP) format as needed by social media platforms or other distribution servers such as distribution server 246, distribution server 248, or distribution server 250. As shown in FIG. 2B distribution server 246 receives a live stream according to an RTMP protocol corresponding to distribution server 246 and distribution server 248, which may be, for example YOUTUBE. Also illustrated is a custom RTMP protocol for sending a live stream to distribution server 250, which may receive an arbitrary RTMP live stream for distributing to other users. It will be appreciated that embodiments of the present disclosure are not limited to RTMPs, and that any real time protocol may be used without departing from the scope hereof. For example, WHIP (WebRTC-HTTP Ingestion Protocol) may be used as a real time protocol for video live streaming. Generally, any real time protocol for delivering audio/video over a network that is now known or later developed is within the scope hereof.

Figure 2C:
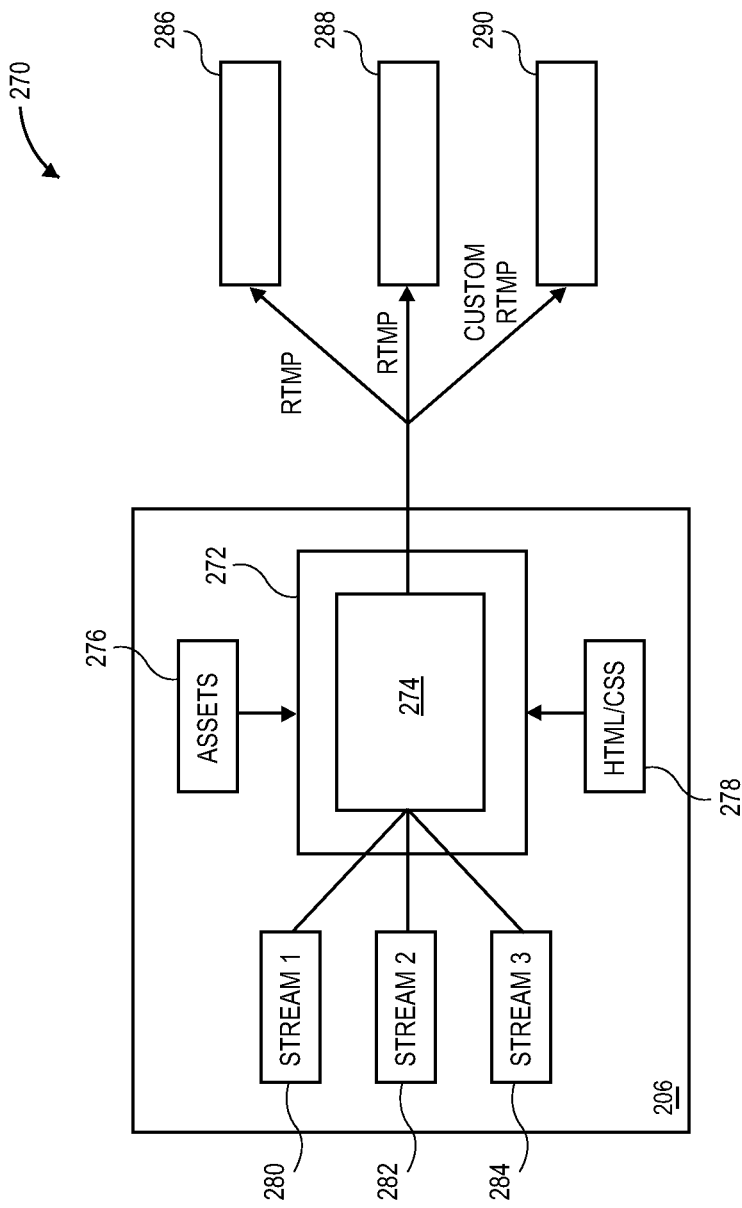
FIG. 2C illustrates elements of a system for carrying out embodiments of the present disclosure.

FIG. 2C illustrates elements of a system 270 for carrying out embodiments of the present disclosure. System 270 illustrates a centralized service in which a single service may be utilized to take on the roles of browser 240 and subsequent downstream encoders 244 described above. A video processing service 272 may run on media server 206. Video processing service 272 may have a browser instance 274 running thereon. The browser instance 274 may be a CHROMIUM instance, for example. As discussed above with respect to FIG. 2B, assets 276 may be provided to video processing service 272 such that browser instance 274 may render various graphical assets in connection with the rendered composite video stream. Browser instance 274 may render a browser window layout that may be formatted in connection with HTML and/or CSS from formatting source 278. Multiple video streams 280, 282, 284 may be received at media server 206 and processed in connection with the browser instance 274 running within video processing service 272. In some embodiments, video processing service 272 is GSTREAMER.

In some embodiments, the multiple video streams 280, 282, 284 may be composited and rendered in memory of browser instance 274. Rendering the composite video live stream in memory allows for resources to be saved. In contrast, to the system 230, system 270 may only render the video in memory without also rendering on a virtual monitor. Video processing service 272 may be configured to carry out the encoding that is performed by subsequent downstream encoders 244 in system 230. Once encoded, the composite video live stream may be transmitted to media providers 286, 288, 290 for distribution out to viewers of the video live stream as previously discussed.

Video Live Streams and Video Stream Events

Figure 3A:
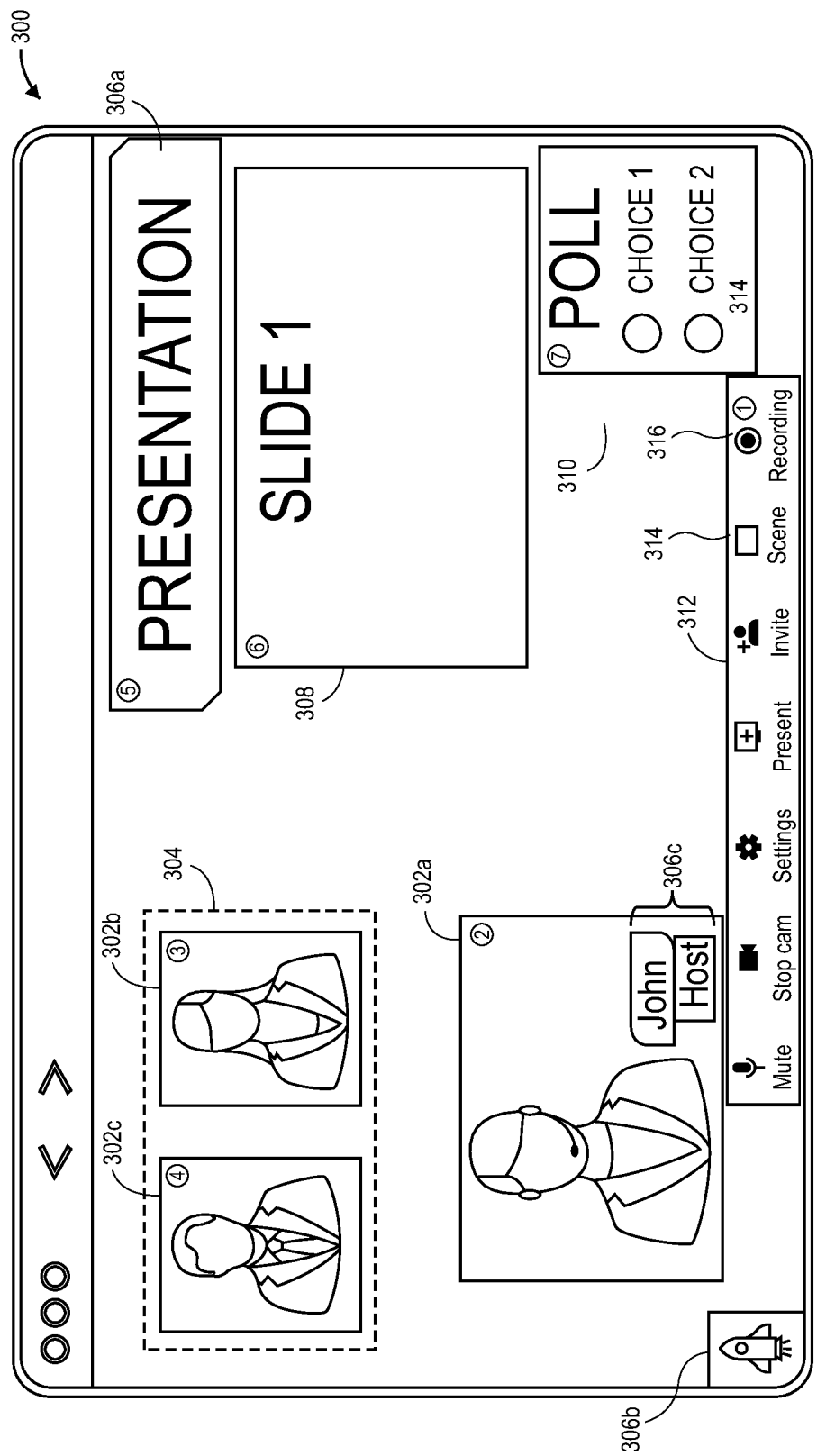
FIG. 3A illustrates a first user interface for some embodiments of the present disclosure.

FIG. 3A illustrates a user interface 300 illustrating a composite video live stream in accordance with embodiments of the present disclosure. User interface 300 may comprise video windows a first video window 302a, a second window 302b, and a third video window 302c configured to render video data from a corresponding first, second, and third video live stream participant. The video windows 302a, 302b, 302c, may be included as part of the composite video stream that may be mixed in connection with a centralized mixing service as discussed above. Each video window 302a, 302b, 302c may be associated with at least one video stream participant. The size and/or location of the video windows 302a, 302b, 302c within user interface 300 may change based on the number of participants and/or user activity during the video live stream. For example, the size of a video window 302a, 302b, 302c for a currently speaking participant may be increased. As another example, the size of the video windows 302a, 302b, 302c may be shrunk and/or the location in user interface 300 may be adjusted when a participant shares their screen or other media.

In some embodiments, video windows 302a, 302b, 302c are associated with a dynamic grid element 304. As shown, video windows 302b, 302c are part of a dynamic grid element 304. In some embodiments, dynamic grid element 304 is a user interface element that comprises one or more video windows 302b, 302c and that dynamically adjusts during a video live stream. Dynamic grid element 304 may also comprise containers or media slots configured to render media data (e.g., screen shared data, an uploaded video, etc.). A user may define how the dynamic grid element 304 adjusts during the video live stream. For example, the user may define how the dynamic grid element 304 adjusts when a third video window is added to the dynamic grid element 304. For example, the dynamic grid element 304 may adjust such that the video windows 302b, 302c within dynamic grid element 304 are stacked on top of one another to form a single column of video windows 302b, 302c rather than the single row that is shown. Dynamic grid elements are discussed further in commonly-owned U.S. patent application Ser. No. 18/176,083, entitled, "DYNAMIC GRID ELEMENTS FOR VIDEO LIVE STREAMING INTERFACES", the entirety of which is incorporated by reference herein.

User interface 300 may also be configured to display various overlays for the video live stream. Overlays may correspond to assets 238, 276 discussed previously. Overlays may comprise a banner overlay 306a, a logo overlay 306b, a comment overlay 306d (see FIG. 3B), a participant information overlay 306c or any other graphical asset that is rendered over at least a portion of user interface 300. The overlays 306a, 306b, 306c, 306d may be added to a video live stream for branding purposes, for example. Additionally, the overlays 306a, 306b, 306c, 306d may be configured to inject additional information, such as displaying comments via 306c, received during the video live stream. As discussed above, the video live stream may be broadcast to various media providers such as TWITCH and YOUTUBE.

Accordingly, viewers may create and post comments while viewing the video live stream via a media provider, and the comments may be integrated back into the video live stream and displayed via comment overlay 306d.

Overlays 306a, 306b, 306c, 306d may be rendered on a separate layer from a layer containing video windows 302a, 302b, 302c and/or dynamic grid element 304. In some embodiments, the overlays are on a layer above or below the layer containing the video windows 302a, 302b, 302c, and the dynamic grid element. In some embodiments, the overlays are on the same layer. Overlays 306a, 306b, 306c, 306d may comprise a transparent portion such that user interface elements on layers below the containers are visible. Overlays may also be added to user interface 300 to mask video windows 302a, 302b, 302c and/or dynamic grid elements 304 to the look of the user interface elements in the video live stream. For example, an overlay may be configured as a circular cutout and rendered in user interface 300 over a rectangular video window 302a, 302b, 302c such that the video window 302a, 302b, 302c instead appears circular when rendered in user interface 300. In some embodiments, overlays 306a, 306b, 306c, 306d are associated with a video window 302a, 302b, 302c and/or a dynamic grid element 304 such that the overlays move and/or adjust with the respective video windows 302a, 302b, 302c and/or dynamic grid element 304. For example, a participant information overlay 306c displaying the name of a participant in a specific video window 302a may be adjusted as the video window 302a moves in user interface 300. Overlays are discussed further in commonly-owned U.S. patent application Ser. No. 17/734,880, entitled, "DYNAMIC OVERLAY ELEMENTS FOR A VIDEO COMMUNICATION SESSION", the entirety of which is incorporated by reference herein.

User interface 300 may also comprise a media window 308. Media window 308 may be configured to render media data for the video live stream. The media data may include screen sharing data, video data (e.g., from an uploaded video), image data (e.g., static or animated), collaborative document editing, or the like. The media window 308 may be inserted into the video live stream at any point during the video live stream. The position of the various user interface elements may adjust when media window 308 is added to user interface 300. In some embodiments, a media window 308 is part of a dynamic grid element 304.

In some embodiments, the video live stream may include one or more instances of widgets 310. The widgets 310 may be any type of overlay that is displayed in user interface 300. Widgets 310 may be generated and updated based on external information. For example, as shown, users may add a poll widget as one instance of widgets 310 to the video live stream, allowing participants and/or viewers to participate in a poll. As with comment overlays 306d, viewers may interact with widgets 310 from the broadcasting media provider. Accordingly, the viewers may participate in the poll (or interact with another widget) through the media provider, which may in turn communicate the data from the viewers to media server 206 to update the widgets 310. As another example, a video live streamer may commentate over a live sporting event, such as a basketball game, and a timer widget may be used to display the current clock and shot clock in the basketball game.

User interface 300 may also comprise a toolbar 312 comprising various tools for use during the live stream. For example, toolbar 312 may comprise a mute tool and a camera tool. The mute tool may control the transmission of audio for the user, and the camera tool may control the transmission of video for the user. A present tool may allow a user to share other data as part of the video live stream. For example, the user may screen share an application, which may be displayed in media window 308. An invite tool may allow the user to cause the transmission of an invite (e.g., in the form of a unique URL, a push notification, an email with the unique URL, etc.) to one or more users to join the video live stream.

Toolbar 312 may also comprise a scene tool 314. Scene tool 314 may be used to adjust a layout of the user interface 300. In some embodiments, scene tool 314 allows for multiple user interface elements in user interface 300 to be adjusted simultaneously. For example, a scene change may comprise re-arranging the user interface elements according to a layout, which may be predefined by a user. For example, the scene tool 314 could be used to change the layout from a first layout where all participants are displayed in equal sized video windows to a second layout where a single participant has a largest video window and the other participants are displayed in smaller video windows of the user interface 300.

Toolbar 312 may also comprise a recording affordance 316. Actuation of recording affordance 316 may initiate recording of the video live stream. As previously discussed, each video live stream participant may record their video data locally, i.e., on a client device of each video live stream participant. Recording locally allows for the quality of the recording to be made at a native quality and avoids degradations of the recording due to bandwidth restrictions, network outages, and the like. In some embodiments, the client device is configured to generate the recording and stream the recording to video processing service 272 while the video live stream is ongoing. In some embodiments, the recording is uploaded after the video live stream ends. In some embodiments, the recording is uploaded during the video live stream, but upload may be paused if a poor network quality, upload speed, or the like is detected. When a sufficient network quality is detected (e.g., above a threshold), upload may be resumed and/or the participant may be prompted to upload the local recording to video processing service 272 at a later point in time.

In some embodiments, the local recordings from each live stream participant may be mixed and composited to obtain a composite video recording. Because the composite video recording thus comprises local recordings made at the native quality, the composite video recording may represent the highest-quality recording of the video live stream. The various overlays 306a, 306b, 306c, 306d that were a part of a video live stream may be added to the composite video recording to replicate the actual video live stream. In some embodiments, a local recording may be edited before being mixed with the other local recordings to generate the composite video recording. For example, it is contemplated that a local recording may have the video quality upscaled (e.g., using a video super-resolution technique) before the local recording is mixed into the composite video recording. As another example, adjustments to the audio may be made before the local recording is mixed. In some embodiments, adjustments to the local recordings are made automatically before mixing. For example, the video quality of one or more local recordings may automatically be upscaled such that each local recording has substantially the same video quality before the local recordings are mixed.

To render the overlays 306a, 306b, 306c, 306d and other assets in the composite video recording, the video live stream may be monitored for events. In some embodiments, detected events are logged, categorized, timestamped or any combination thereof. In some embodiments, event tracking may begin upon actuation of recording affordance 316 and terminate when recording ends (or when the live stream ends). In some embodiments, events are tracked and/or logged throughout the video live stream regardless of whether the live stream is being recorded. In some embodiments, logging an event includes storing a timestamp for the event.

Generally, an event may be any change that occurs during the video live stream. As one example, an event may the actuation of recording affordance 316 to begin (or end) recording of the video live stream. Thus, an event corresponding to the actuation of the recording affordance 316 may be logged and timestamped. In some embodiments, event logging may also comprise associating various metadata with the event. For example, the user who actuated the recording affordance 316 may be saved as metadata.

In some embodiments, events are categorized. Categorizing events may improve the efficiency at which events can be reorganized when generating a composite video recording as further below. Events may be assigned to zero or more categories. In some embodiments, events are categorized based on a participant associated with the event, the user interface element, or the like. For example, a first participant may begin screen sharing in the video live stream. Thus, the screen sharing event may be logged and categorized as associated with the screen sharing user. By categorizing events, the events may become searchable and/or filterable when generating the composite video recording. For example, an editing user who is later editing the composite video recording, may search all events that are associated with the screen sharing user. Similarly, the editing user may search for all events associated with a specific user interface element or type of user interface element. For example, the editing user may search for all events involving a banner overlay 306a and/or search for all events involving a specific banner overlay 306a.

Other exemplary events that may be detected during a video live stream are now discussed. In some embodiments, a participant leaving or entering the video live stream is an event. In some embodiments, detection of a participant speaking (or a participant finishing speaking) is an event. Various other events associated with a participant may be detected and logged. For example, comments posted by a participant, files shared by a participant, and other media associated with the participant may be logged. As another example, the promotion or demotion of a participant within a participant hierarchy of the video live stream may be detected and logged as an event. The participant hierarchy may define roles and/or permissions that a participant has during a video live stream such that a first participant at a higher hierarchical position than a second participant has increased permissions relative to the second participant.

In some embodiments, events are related to a video window 302a, 302b, 302c or a media window 308. In some embodiments, a 302a, 302b, 302c being adjusted is an event. For example, the resizing, addition, deletion, repositioning, or the like of a video windows 302a, 302b, 302c may be an event. Likewise, changes to a dynamic grid element 304 may be an event. For example, a new participant joining the video live stream, thereby causing the addition of a video window 302a, 302b, 302c to the dynamic grid element 304 may be an event. Similarly, the addition of a video window 302a, 302b, 302c to the dynamic grid element 304 may cause an adjustment of a layout thereof, which may also be an event.

Changes associated with overlays 306a, 306b, 306c, 306d may also be events in a video live stream. As with video windows 302a, 302b, 302c, the addition, deletion, resizing, repositioning, or the like of an overlay 306a, 306b, 306c, 306d may be detected events. As discussed above, one or more overlays may be associated with a video window 302a, 302b, 302c such that the associated overlay(s) change along with the video window. In some such embodiments, corresponding changes to the overlay(s) are detected events and/or the changes to the overlay(s) based on changes to the associated video window 302a, 302b, 302c is detected and logged as a separate event from the changes to the associated video window 302a, 302b, 302c.

In some embodiments, events are associated with media that is shared or otherwise displayed as part of a video live stream, such as media displayed in media window 308. For example, a participant beginning and/or ending screen sharing media may be an event. In some embodiments, the shared media file is saved such that the media file can later be retrieved when generating the composite video recording. For example, if a slide deck is presented during the video live stream, the slide deck may be stored in a data store for later retrieval. Similarly, any other media (e.g., image file, word processing document, spreadsheet document, etc.) may be stored. In some embodiments, when a participant is screen sharing, a recording of the screen share may also be made locally at the client device. In some embodiments, the screen sharing recording is included as part of the local recording of the screen sharing participant. In some embodiments, the screen sharing recording is made separately from the recording of the local recording of the participant. In some embodiments, if the participant screen shares a file that is uploaded to media server 206, a local recording of the screen share is not generated, and the file is retrieved from media server 206 and replayed during the composite video recording.

In some embodiments, events that occur while sharing media within the video live stream are detected, logged, categorized, etc. For example, while sharing a video, the sharing user (or another user) may pause the video, and the pausing of the video may be an event. Likewise, resuming play of the video may be a detected event. Other actions taken (e.g., fast forward, rewind, adjust playback speed, adjust volume, etc.) when playing a media file may be events in the video live stream. As another example, a participant may be sharing a slide deck that was uploaded to system 270, and navigation between slides in the slide deck may be detected as events. As another example, participants may collaborate in a collaborative document during a video live stream, and changes made to the video live stream may be detected and logged for later playback in generating the composite video recording. Other events that may be detected while sharing media in a video live stream will be readily apparent to one of skill in the art.

As another example, events may be related to widgets 310. Generally, any change associated with any instance of widgets 310 may be an event. For example, for the poll widget shown, each vote received for the poll may be a separate event. Likewise, the addition of the poll widget to the video live stream, the opening/closing of voting, and the like may be events.

By way of example, user interface elements in FIG. 3A are numbered to indicate a chronological order in which the elements may have been added to the video live stream and/or the order in which an event associated with the element occurred. Thus, in this example, the first detected event was the actuation of recording affordance 316. There-after, an event associated with the host user occurred (event 2). For example, the event 2 may have been the host user joining the video live stream. Likewise, events 3 and 4, associated with the video windows 302b, 302c in dynamic grid element 304 may correspond to the corresponding participants joining the video live stream, thereby causing the addition of the respective video windows 302b, 302c to the user interface 300. Because these video windows 302b, 302c are within a dynamic grid element 304, other events may have occurred, been detected, and logged responsive to the participants sequentially joining the video live stream. For example, when the third participant joins the video live stream, the size and/or location of the second video window 302b for the second participant may have changed, which may be detected and logged as an event.

Events 5 and 6 are also shown, corresponding to the addition of a banner overlay 306a and the sharing of the slide deck to media window 308. Lastly, event 7 corresponds to the addition of one or more instances of widgets 310 (here, a poll widget) to the user interface 300. Thus, as discussed previously, a timeline may be generated that comprises each event occurring within the video live stream. Each event on the timeline may be associated with a timestamp, a user(s), a category, or the like. When generating the composite video recording, as discussed further below, the timeline may be used to determine when to add assets into the recording, which assets to add, when to adjust the layout of the user interface 300 and/or any elements thereof, or the like. Furthermore, the timeline may be edited to generate a modified version of the recording that may differ from the actual events of the video live stream.

Turning now to FIG. 3B, user interface 300' is illustrated for some embodiments of the present disclosure. User interface 300' illustrates how a user interface for a video live stream may change throughout the video live stream.

Various changes of user interface 300 are illustrated with respect to FIG. 3B. For example, the poll widget has been removed and replaced with a comment overlay 306d (event 8). Additionally, event 9 includes a third video window 302c for a third participant being added to dynamic grid element 304, and dynamic grid element 304 has likewise expanded horizontally to accommodate the third participant. The last event (event 10) illustrated in FIG. 3B is the changing of the slide in the slide deck depicted in media window 308. Each of these changes may be events that may be detected and logged to generate a timeline of events that can be used to create a custom composite video recording as discussed further below.

Composite Video Recordings

Figure 4:
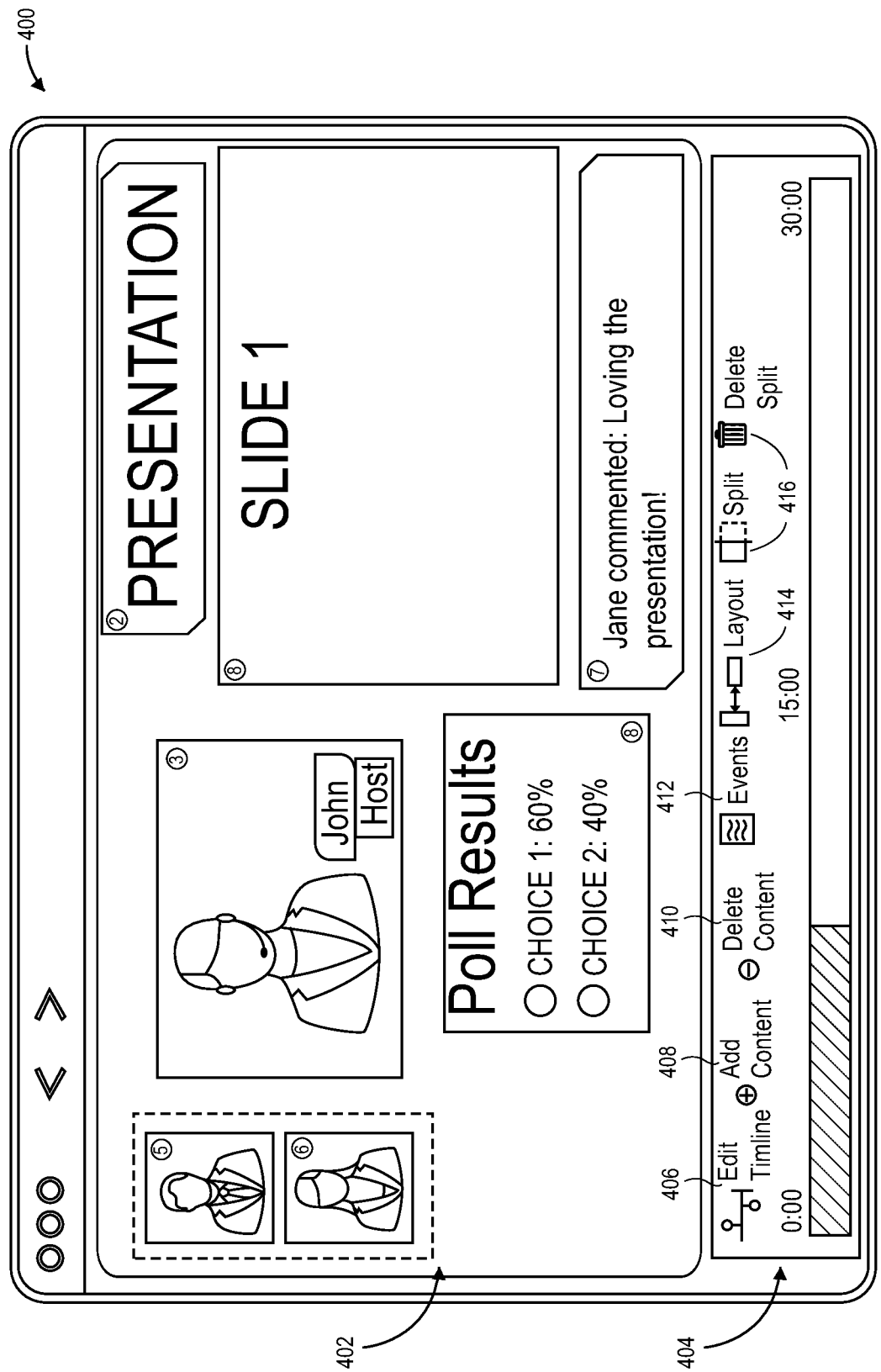
FIG. 4 illustrates a user interface for editing a composite video recording for some embodiments of the present disclosure.

FIG. 4 illustrates an editor interface 400 in accordance with embodiments of the present disclosure. Editor interface 400 may allow a user to edit recordings of a video live stream to create custom recordings that include the native recordings from each of the live stream participants, along with any assets, media, and the like that was a part of the video live stream. It will be appreciated that a recording of the video live stream may also be made from the data streams received at media server 206.

In some embodiments, editor interface 400 comprises a display pane 402 and an editing pane 404. The display pane 402 may display the composite video recording, and the editing pane 404 may comprise various options, tools, etc. for making edits to the composite video recording. In some embodiments, responsive to recording ending in a video live stream, a composite video recording that is a replica of the video live stream is automatically generated. In some embodiments, the composite video recording is generated by compositing the local recordings together and replaying the plurality of events at the respective timestamps. As previously discussed, assets and other media associated with a video live stream may be stored such that the assets and media are retrievable for remixing with the local recordings to create the composite video recording. Accordingly, an editing user may use editor interface 400 to modify the composite video recording to generate a recording that is different from the actual video live stream. In some embodiments, a replica composite video recording is not automatically generated, and the editing user provides an instruction to generate the composite video recording. Accordingly, the editing user may generate a recording of the composite video recording that is different from the video live stream without first generating a replica recording of the video live stream.

In some embodiments, editing pane 404 comprises one or more tools for editing the composite video recording. In some embodiments, editing pane 404 comprises a timeline tool 406, an add content tool 408, a delete content tool 410, an events log 412, a layout tool 414, split tools 416, or any combination thereof. In some embodiments, user interface elements in display pane 402 are selectable, and the tools displayed in editing pane 404 may change based on the selected user interface element. For example, selecting a comment overlay 306d for editing may result in different tools being presented in editing pane 404 than if a media window 308 displaying a slide deck was selected. For example, a tool for changing the text in a comment displayed in comment overlay 306d (e.g., to correct a typographical error) may not be present in the editing pane 404 when the media window 308 for the slide deck is the selected user interface element. Likewise, a tool for modifying the slide deck may comprise a control for adjusting the displayed slide in the slide deck, which may not be present in the editing pane 404 for the comment overlay 306d.

The timeline tool 406 may be utilized to adjust the timeline of the composite video recording. As in FIG. 3A, each user interface element is labeled with a number indicating the chronological order in which an event associated therewith occurs in the composite video recording. Here, the banner overlay 306a has been changed to be displayed second in chronological order (with the first event being the start of the recording). Meanwhile, the host user is added to the recording third, followed by the two participants in dynamic grid element 304 as discussed with respect to FIG. 3A. In contrast to the layout of user interface 300 depicted in FIGS. 3A-3B, the video windows 302b, 302c for the second and third participants have been rearranged and are displayed in a vertical stack. In this example, the composite video recording is shown in display pane 402 at a time before fourth video window 302d has been added to the composite video recording. The comment overlay 306d is displayed after the participants are shown in display pane 402. Finally, the slide deck is displayed after the comment overlay 306d. Lastly, an eighth event includes the addition of the poll widget to display pane 402 in a different location than the poll widget was rendered during the video live stream. Additionally, the poll widget is displayed with the results of the poll.

Thus, it can be seen how reordering the various events can allow an editing user to generate a video recording that is different from the video live stream. Accordingly, any mistakes made during the video live stream may be fixed. For example, the editing user (who may be the host user controlling the layout of the video live stream) may have displayed the banner overlay 306a later in the video live stream than desired. Accordingly, the editing user may adjust the timeline to display the banner overlay 306a at the desired time. Because the composite video recording may be generated by mixing the plurality of local recordings and retrieving the stored assets to mix with the local recordings, the adjustment of the various events is enabled. Furthermore, the use of local recordings provides for a high-quality video recording to be produced that may be of a higher fidelity than the video live stream.

The composite video recording may also be edited using add content tool 408. In some embodiments, the add content tool 408 allows for content to be inserted to the composite video recording. The content may be content that was not present in the original video live stream. Generally, any content may be added to the composite video recording using add content tool 408. For example, overlays, such as any of overlays 306a, 306b, 306c, 306d, widgets 310, audio and/or video files, background images, background music, and the like may be added. The content may be retrieved from assets 238, 276 and/or uploaded to assets 238, 276 before being added into the composite video recording.

When adding content to the composite video recording, the editing user may specify various parameters defining how the added content is added to the composite video recording. For example, the editing user may indicate a timestamp at which the content should be added to the composite video recording. Likewise, the editing user may also indicate a timestamp at which the added content should no longer be displayed. In some embodiments, one or more start timestamps and one or more end timestamps may be specified. For example, the editing user may wish to display a banner overlay 306a to the composite video recording from 2:00 to 3:00 in the recording and also for the last minute of the composite video recording. The editing user may also define a position of the added content within the user interface. Other parameters that may be specified will be readily apparent to one of skill in the art. The delete content tool 410 may be used to delete a user interface element from the composite video recording. Generally, any user interface element present in a composite video recording may be deleted. For example, the editing user may specify to delete the logo overlay 306b from the composite video recording.

Editing pane 404 may further comprise events log 412. Events log 412 may be selected to access a log of events from the video live stream. In some embodiments, each event from the video live stream is added to events log 412.

Editing pane 404 may further comprise layout tool 414 and split tools 416. Layout tool 414 may be utilized to adjust an aspect ratio of the composite video recording. For example, the aspect ratio may be adjusted from 16:9 to 9:16 to obtain a vertical composite video recording. In some embodiments, the layout tool 414 may be utilized for repurposing the composite video recording, such as for publishing to platforms that utilize short-form vertical videos for viewing on a mobile device.

Split tools 416 may provide for the editing user to split the composite video recording into one or more shorter video chunks that may be republished. For example, the editing user may select a 60-second segment of the composite video recording, split it from the rest of the composite video recording, and change the layout to a vertical layout using layout tool 414 for publishing onto a short-form video publishing platform. In some embodiments, editing pane 404 further comprises a time bar via which the editing user may select one or more video chunks for splitting into a separate video. In some embodiments, split video chunks are saved separately from the composite video recording and, accordingly, may be further edited without affecting the composite video recording. In some embodiments, split tools 416 may be used to split and delete one or more segments from the composite video recording. For example, a period of dead air in the video live stream may be removed from the composite video recording using split tools 416.

In some embodiments, split videos have user interface elements automatically adjusted relative to the display in the video live stream. For example, where three video windows 302a, 302b, 302c, may be displayed as shown in FIG. 3A, when a split portion of the video live stream is generated, the video windows may automatically be rearranged into a single column to match the vertical layout of the split video. Each video window may accordingly have its aspect ratio adjusted. Likewise, any overlays or other assets may similarly be adjusted based on the new aspect ratio of the split video.

Figure 5:
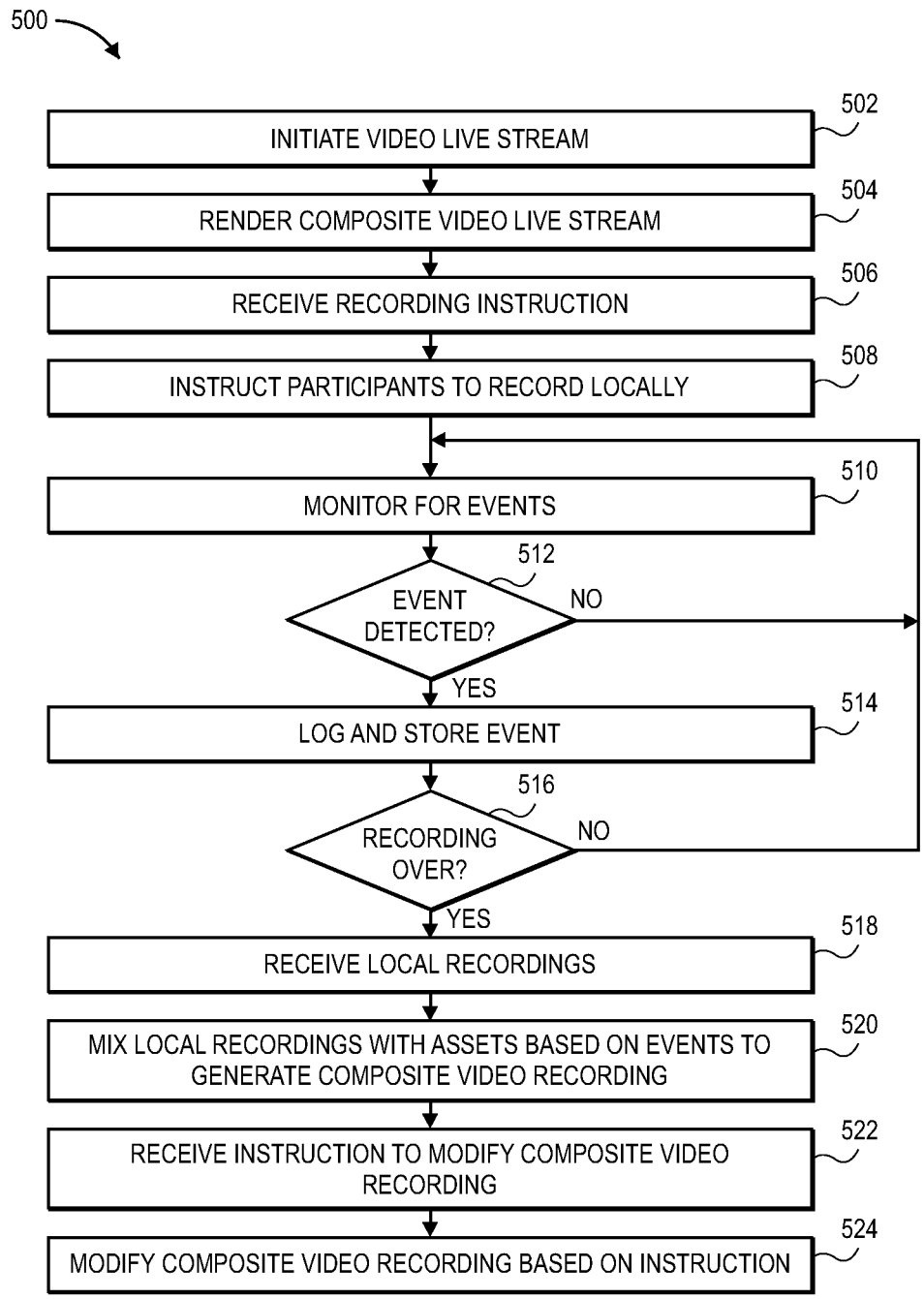
FIG. 5 illustrates an exemplary method in accordance with aspects of the present disclosure.

FIG. 5 illustrates a method 500 in accordance with embodiments of the present disclosure. Method 500 may begin at step 502 where a video live stream is initiated. As discussed above, the video live stream may comprise one or more video live stream participants. Each video live stream participant may transmit audio, video, media, or any combination thereof that is mixed and rendered as part of the video live stream.

At step 504, the video live stream is rendered. As discussed above with respect to FIGS. 2A-2C, the video and audio data from each participant may be mixed with the video and audio data from other participants, along with any video assets and other media that is added to the video live stream such that a single composite video stream is generated and broadcast to viewing users.

At step 506, a recording instruction is received. In some embodiments, the recording instruction is received via actuation of recording affordance 316. Recording may be initiated at any time during the video live stream. In some embodiments, recording may be initiated prior to the video live stream beginning. In some embodiments, any user can initiate recording. In some embodiments, only users with certain permissions may initiate recording.

Next, at step 508, the video stream participants may be instructed to record locally. Recording locally allows for a native quality of the audio and video data generated by the participants to be obtained. Thus, the highest quality recording of each participant may be obtained because the local recordings are not subject to losses due to bandwidth constraints. In some embodiments, a separate video file and a separate audio file is generated for each local participant. In some embodiments, the local recording is a mixed recording of the audio and video recordings. The local recording may only contain data generated at the client device of the local participant and may not include any data from other participants and/or any overlay data. If a video stream participant shares their screen, a separate local recording of the screen sharing may be created. In some embodiments, the local recording of the screen shared data includes a live video stream of the screen sharing participant.

At step 510, the system may monitor for events. Events may include any change to the video live stream, as previously discussed. In some embodiments, a user (e.g., a host user of the video live stream) can define which events to monitor for. For example, the host user may elect to only monitor changes in overlays 306a, 306b, 306c, 306d. In some embodiments, the system only monitors for events while recording of the video live stream is ongoing. Accordingly, a timeline of events during a video live stream may begin with recording being initiated and may end with recording being terminated, which may occur when the video live stream is ended.

At test 512, it may be determined whether an event has been detected. If no, processing may proceed back to step 510, and the video live stream is continuously monitored for events. If yes, processing may proceed to step 514, and the event may be logged, stored, categorized, or the like. In some embodiments, logging the event comprises storing a timestamp of the event, along with any metadata. In some embodiments, the event is categorized as previously discussed.

Processing may then proceed to test 516, where it may be determined whether recording of the video live stream is over. If recording has not ended, processing may proceed back to step 510 to continue monitoring for events. If yes, processing may proceed to step 518. At step 518, a local recording may be received. In some embodiments, the video stream participants upload the local recordings during the video live stream such that step 518 may occur simultaneously with other steps in method 500. If the video live stream participant experiences poor network quality that causes a degradation to the video streamed as part of the video live stream, uploading of the recording may be paused. The uploading may resume once the network quality improves or after the video live stream ends.

At step 520, the composite video recording may be generated. Generating the composite video recording may comprise replaying the plurality of local recordings and compositing the individual local recordings into a single composite video recording similar to the manner discussed above when compositing video for the video live stream. The generation of the composite video recording may also be based on the plurality of events. That is, the plurality of events may be indicative of when to insert, remove, or otherwise modify the composite video recording to replicate the events of the video live stream. For example, the plurality of events may indicate that a banner overlay 306*a* should be inserted in a location on the user interface at a specific time. Furthermore, another event may indicate that three minutes after the insertion, the banner overlay 306*a* should be removed from the composite video recording. Thus, by logging the events, the composite video recording may replicate the video live stream with the higher quality media obtained from the local recordings.

In some embodiments, the generation of the composite video recording may be split among a plurality of mixing servers, such as mixing servers 210 discussed above. For example, if the composite video recording is sixty minutes long, the composite video recording may be split into a plurality of video chunks, with each chunk mixed by a distinct mixing server. For example, the composite video recording may be split into six ten-minute-long video chunks, and six mixing servers may each mix one of the video chunks. Once each mixing server mixes the respective video chunk, the composite video recording video chunks may then be merged to create the sixty-minute recording. The merging may be performed by one of the mixing servers, in some embodiments, or by any other server. Accordingly, the time to create the composite video recording may be reduced by splitting the compositing across multiple servers. For example, where it would take a single mixing server sixty minutes to generate the sixty-minute-long composite video recording, splitting the composite video recording into six ten-minute chunks to be processed by six different mixing servers may thereby reduce the processing time to ten minutes.

In some embodiments, a composite video recording is split into chunks of equal length for processing by the video mixing servers. In some embodiments, the chunks are split based on an estimated time to mix each chunk such that the video chunks may be of different lengths; however, the video chunks may have substantially similar processing times for mixing. For example, a first chunk may span a ten-minute portion of the video live stream where twenty events occurred, and a second chunk may span a fifteen-minute portion of the video live stream where ten events occurred. Because of the increased number of events in the first chunk relative to the second chunk, the processing time for the two chunks may be similar. At step 522, an instruction to modify the composite video recording may be received. The instruction may be received from an editing user via editor interface 400 as discussed previously. In some embodiments, the instruction indicates at least one event of the plurality of events to modify. For example, the editing user may provide an instruction to render the banner overlay 306*b* ten seconds before the banner overlay 306*a* was actually displayed during the video live stream. In some embodiments, the instruction is the addition of an element not present. For example, a newly created banner may be added to the video live stream. Likewise, the instruction may indicate to delete an overlay element that was present in the video live stream from the composite video recording.

At step 524, the composite video recording is modified based on the instruction. In some embodiments, modifying the composite video recording comprises changing the timestamp associated with the event such that the event occurs at a new timestamp. In some embodiments, the modification is the addition or deletion of an event as previously discussed. Thus, in some embodiments, a first composite video recording is generated that is an exact replica of the video live stream and one or more additional composite video recordings may be created that are modifications of the first composite video recording.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. One or more non-transitory computer-readable media storing computer executable instructions that, when executed by at least one processor, perform a method for generating video live stream recordings, the method comprising:

initiating a video live stream, the video live stream comprising a plurality of participant video streams received from a plurality of video stream participants;

rendering the video live stream by compositing the plurality of participant video streams and one or more assets;

during the video live stream, receiving an upload of an asset from one of the plurality of video stream participants;

responsive to receiving the upload of the asset:
causing display of the asset in the video live stream; and
storing the asset in a data storage;

logging a plurality of events during the video live stream;

receiving a local recording from each of the plurality of video stream participants to obtain a plurality of local recordings,
wherein each video stream participant is configured to generate the local recording on a participant client device;
generating a first composite video recording for the video live stream by compositing the plurality of local recordings and replicating the plurality of events at a timestamp for each event of the plurality of events,
wherein generating the first composite video recording comprises retrieving the asset from the data storage and inserting the asset into the first composite video recording at the timestamp;
receiving an instruction to modify an event of the plurality of events in the first composite video recording; and
responsive to receiving the instruction, modifying the event in the first composite video recording to obtain a second composite video recording.

2. The computer-readable media of claim 1,
wherein the event is associated with the asset,
wherein modifying the event comprises adjusting the timestamp associated with the asset.

3. The computer-readable media of claim 1, wherein the method further comprises:
receiving a second instruction to modify the first composite video recording,
wherein the second instruction is one of an addition of a new asset or a deletion of the asset; and
responsive to receiving the second instruction, modifying the second composite video recording based on the second instruction.

4. The computer-readable media of claim 1, wherein the one or more assets comprises at least one of a graphical overlay or a media file.

5. The computer-readable media of claim 1,
wherein the event is an addition of a user interface element to a user interface for the video live stream,
wherein modifying the event comprises modifying a location of the user interface element within the user interface.

6. The computer-readable media of claim 1, wherein the method further comprises:
receiving a second instruction to generate a split video portion from the second composite video recording; and
responsive to receiving the second instruction, generating the split video portion, wherein the split video portion comprises a first aspect ratio distinct from a second aspect ratio of the second composite video recording.

7. The computer-readable media of claim 1, wherein the event is associated with a livestream widget.

8. A system for generating video lives stream recordings, the system comprising at least one processor programmed to carry out computer-executable instructions to perform a method of for generating video live stream recordings, the method comprising:
initiating a video live stream, the video live stream comprising a plurality of participant video streams received from a plurality of video stream participants;
rendering the video live stream based on the plurality of participant video streams and a plurality of assets;
responsive to receiving a first instruction to record the video live stream, transmitting a second instruction to each of the plurality of video stream participants to generate a local recording of a corresponding participant video stream;
detecting a plurality of events during the video live stream,
wherein an event of the plurality of events is a scene layout change causing a simultaneous change to at least two assets of the plurality of assets in the video live stream;
storing a timestamp for each event of the plurality of events;
receiving the local recording from each of the plurality of video stream participants to obtain a plurality of local recordings;
generating a composite video recording for the video live stream by compositing the plurality of local recordings and replicating the plurality of events at the timestamp for each event of the plurality of events; and
modifying at least one event of the plurality of events by adjusting the timestamp associated with the scene layout change to obtain a modified composite video recording.

9. The system of claim 8, wherein the modified composite video recording is a first modified composite video recording and wherein the method further comprises:
receiving a third instruction to modify at least one additional event of the plurality of events in the composite video recording; and
responsive to receiving the third instruction, modifying the at least one event to obtain a second modified composite video recording.

10. The system of claim 9, wherein the plurality of events comprises one or more comments received during the video live stream.

11. The system of claim 10, wherein modifying the at least one event comprises changing a text of a comment of the one or more comments.

12. The system of claim 8, wherein the modified composite video recording is a first modified composite video recording and wherein the method further comprises:
receiving a third instruction to modify an aspect ratio of the composite video recording; and
responsive to receiving the third instruction, generating a second modified composite video recording based on the aspect ratio.

13. The system of claim 8, wherein the composite video recording is generated by a plurality of mixing servers.

14. A method for generating video live stream recordings, the method comprising:
initiating a video live stream, the video live stream comprising a plurality of participant video streams received from a plurality of video stream participants;
rendering the video live stream based on the plurality of participant video streams and one or more assets;
logging a plurality of events during the video live stream;
instructing each of the plurality of video stream participants to generate a local recording on a participant client device of each of the plurality of video stream participants;
responsive to a video stream participant initiating a screen share session, transmitting an additional instruction to the video stream participant to generate an additional local recording of the screen share session;
receiving the local recording from each of the plurality of video stream participants to obtain a plurality of local recordings; and
generating, based on the plurality of local recordings and the plurality of events, a combined recording for the video live stream.

15. The method of claim 14,
wherein at least one asset of the one or more assets is associated with an event of the plurality of events,
wherein generating the combined recording comprises inserting the one or more assets into the combined recording based on the plurality of events.

16. The method of claim 14,
wherein a first event of the plurality of events is a screen share event of a slide deck,
wherein a second event of the plurality of events is a slide change of the slide deck.

17. The method of claim 16, further comprising:
responsive to receiving an instruction to modify the second event, modifying the second event,
wherein modifying the second event comprises causing the slide change of the slide deck to occur at a first time distinct from a second time at which the slide change occurred in the video live stream.

18. The method of claim 14, wherein each local client device is configured to upload the local recording during the video live stream.

19. The method of claim 14, further comprising:
responsive to detecting an upload speed below a threshold upload speed, pausing an upload of the local recording; and
responsive to detecting the upload speed is above the threshold upload speed, resuming the upload of the local recording.

20. The method of claim 14, further comprising categorizing the plurality of events.

* * * * *